(No Model.) 5 Sheets—Sheet 1.
T. H. MÜLLER & J. W. DECASTRO.
PROCESS OF SEPARATING STARCH.

No. 273,128. Patented Feb. 27, 1883.

Witnesses:
Frankland James.
William Paxton

Inventors
Tuile Henry Müller
J. W. Decastro

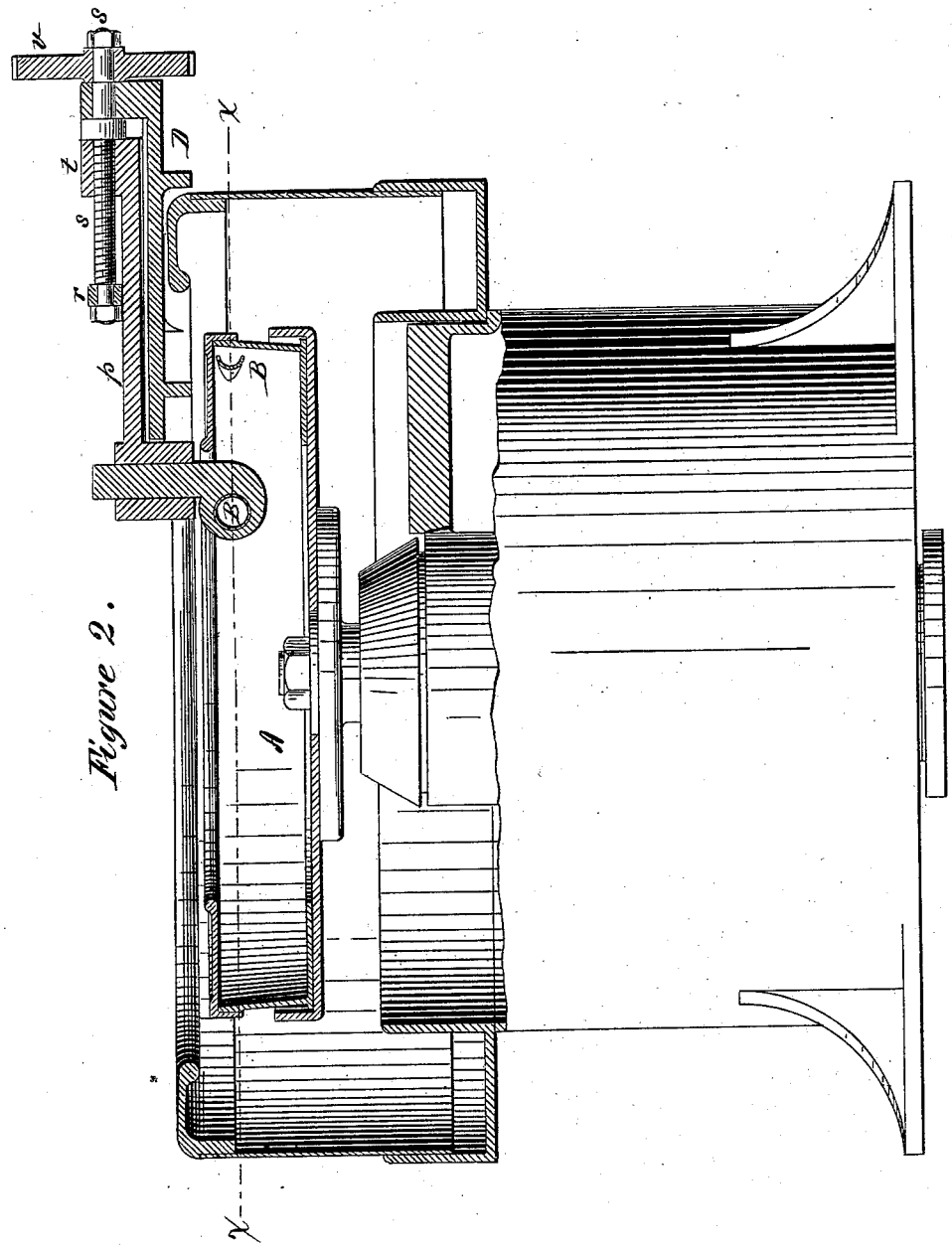

(No Model.) 5 Sheets—Sheet 3.

T. H. MÜLLER & J. W. DECASTRO.
PROCESS OF SEPARATING STARCH.

No. 273,128. Patented Feb. 27, 1883.

N. PETERS, Photo-Lithographer, Washington, D. C.

(No Model.) 5 Sheets—Sheet 4.

T. H. MÜLLER & J. W. DECASTRO.
PROCESS OF SEPARATING STARCH.

No. 273,128. Patented Feb. 27, 1883.

(No Model.) 5 Sheets—Sheet 5.
T. H. MÜLLER & J. W. DECASTRO.
PROCESS OF SEPARATING STARCH.
No. 273,128. Patented Feb. 27, 1883.
*Figure 7.*
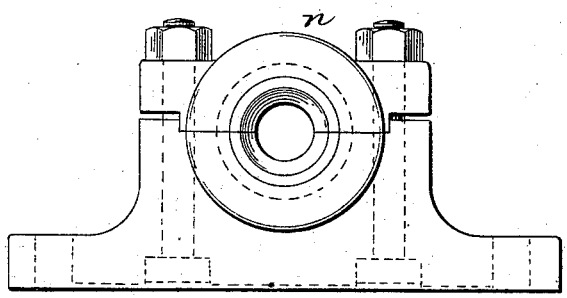
*Figure 8.*
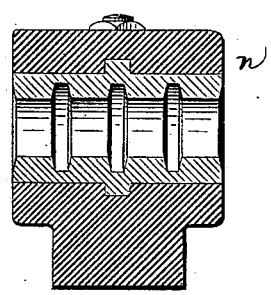
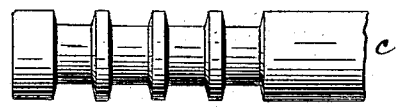
*Figure 9.*
*Figure 10.*
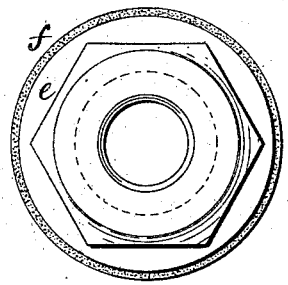
*Figure 11.*
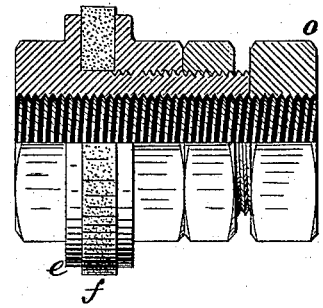

UNITED STATES PATENT OFFICE.

TEILE H. MÜLLER AND JACOB W. DECASTRO, OF NEW YORK, N. Y.

PROCESS OF SEPARATING STARCH.

SPECIFICATION forming part of Letters Patent No. 273,128, dated February 27, 1883.

Application filed August 25, 1882. (No model.)

*To all whom it may concern:*

Be it known that we, TEILE HENRY MÜLLER and JACOB W. DECASTRO, both of the city, county, and State of New York, have invented a new and useful Improvement in Processes of Separating Starch, of which the following is a full, true, and exact description, reference being had to the accompanying drawings.

We propose by this improved process to separate the starch and gluten contained in starch-water, depositing the starch in a suitable basket or receptacle and continuously removing the gluten. After the basket or chamber has been filled with the deposited starch it is readily removed by washing or through suitable openings in the bottom. In our process the starch-water is caused to flow into a revolving centrifugal basket, and by means of the centrifugal force and difference in specific gravity the gluten is driven to the inside of the basket, forming an inner surface there, while the starch forms an outer ring toward the periphery of the basket. A removing apparatus continually removes the gluten as it is deposited, thereby leaving in the basket a deposit of pure starch, which may be removed by any suitable means.

Figure 1:
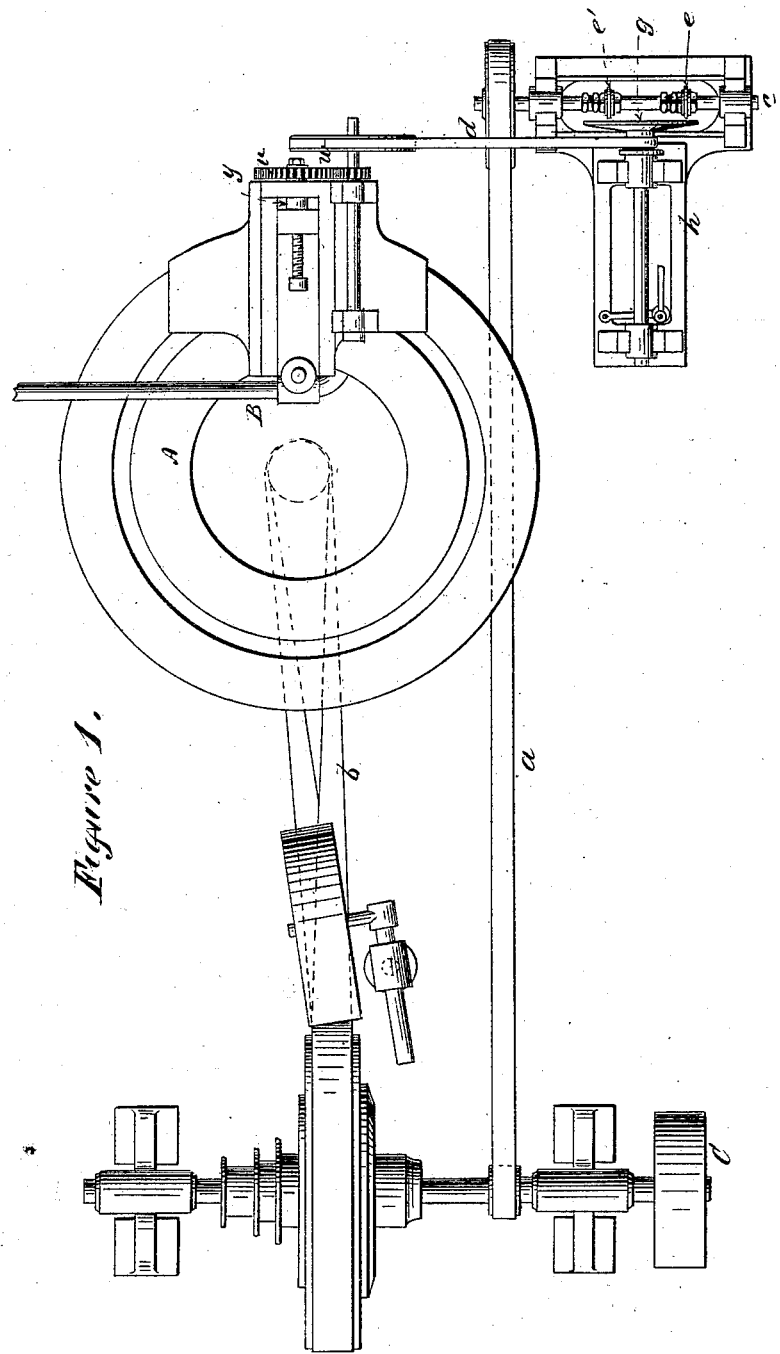
Figure 4:
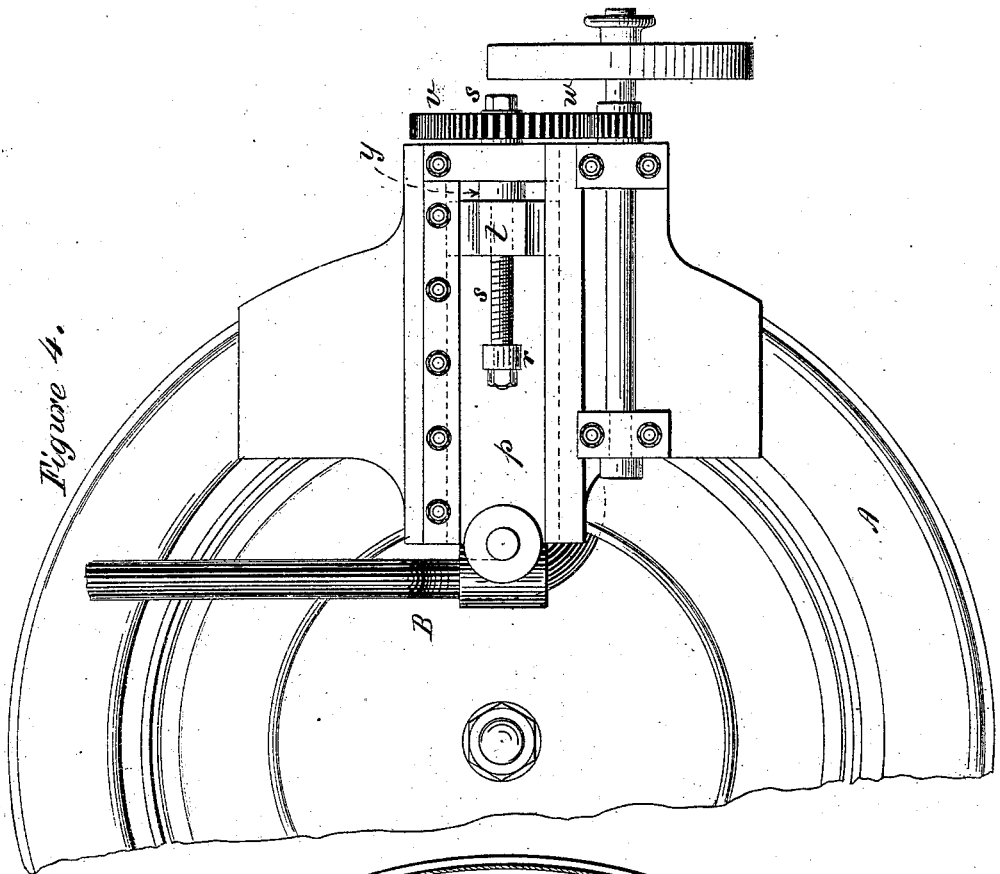
Figure 3:
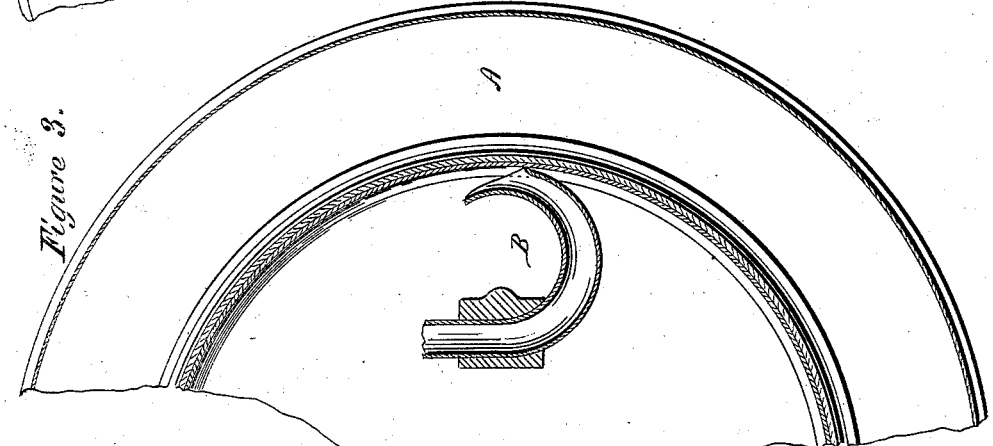
Figure 5:
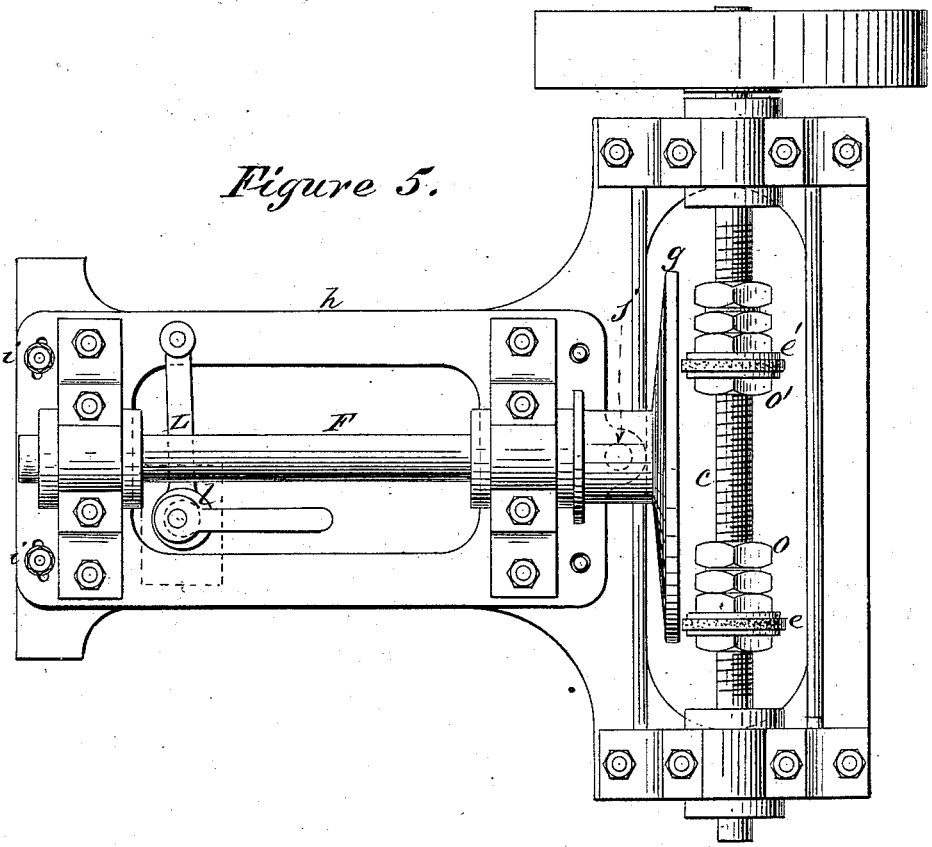
Figure 6:
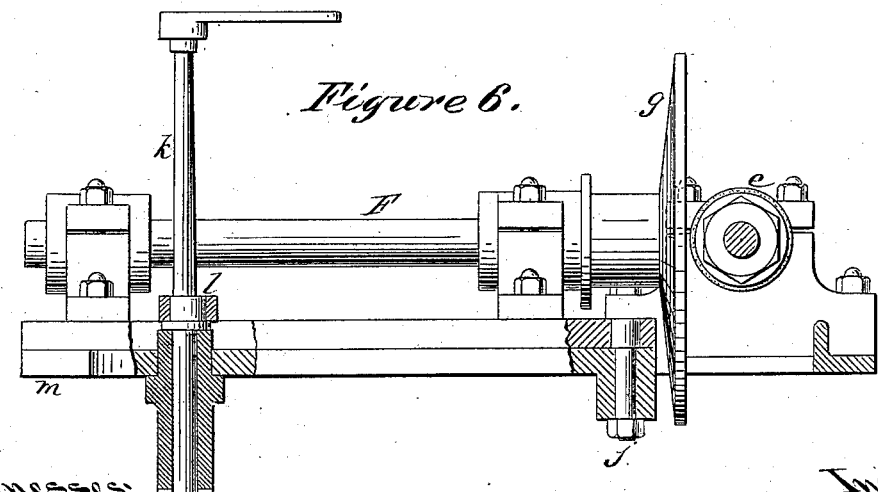

The invention will be readily understood from the accompanying drawings, in which Figure 1 represents a plan view of the entire apparatus; Fig. 2, a section through the basket of the centrifugal machine and the removing apparatus; Fig. 3, a detailed view of the cutter or removing-tube, being a section through the line *x x*, Fig. 2; Fig. 4, a detailed view of the apparatus for adjusting the cutter; Fig. 5, a plan view of apparatus for determining the rate of motion for the cutter; Fig. 6, a view at right angles to Fig. 5, partly in section; Figs. 7, 8, 9, 10, and 11, details of the reversing and adjusting apparatus shown in Fig. 5.

The apparatus consists generally of a centrifugal machine. In the form shown, one open at the top is used. This basket is driven from below, and is known generally as an "under-driven" machine. This basket may be of any suitable construction, and may be arranged as a hanging-basket, if preferred. An adjustable cutter or removing apparatus is provided, which, after the bodies have been separated in the basket, in the manner to be described, by the difference of specific gravity and the centrifugal force exerted upon them in the machine, will continuously remove that one of said bodies which is deposited toward the center of the basket or on the inside thereof.

The invention principally relates to the method of operating this cutter, and to its introduction within a centrifugal machine.

In our drawings similar letters refer to similar parts.

A represents the basket of the centrifugal machine, driven from the power-shaft C by belt *b*.

Attached to the support of the basket is the cutter-tube B, which is adjustable toward and from the periphery of the basket. The shape of this cutter is shown in section in Fig. 3; but we do not limit ourselves to this form. The cutter is supported upon the slide *p*, which is longitudinally adjustable on the frame or bed D. This slide, as shown, is arranged to operate in the dovetailed grooves, as shown in Fig. 4. By moving the slide inward and outward the position of the cutting-edge of B with reference to the periphery of the basket is determined. The position of the slide *p* is determined by the screw *s*, which engages with the nut *t*, attached to and moving with the slide. The screw *s* is supported in the frame B, and its longitudinal motion is prevented by the gear-wheel *v* and collar *y*. By rotating the wheel *v* in one direction the slide and the cutter will be forced inward toward the center of the basket until its motion is arrested by the stop *r*. Its motion outward would be arrested by the collar *y*.

In practical operation it is necessary that the cutter should be moved both inward and outward, and it is exceedingly desirable that its velocity of movement in both directions should be exactly determinable, and the apparatus shown is a very convenient and efficacious means of carrying out this design. This apparatus is shown in detail in Figs. 5, 6, 7, 8, 9, 10, and 11. It consists generally of a power-shaft, *c*, driven by belt *a* from the main shaft C. Upon this shaft are two friction-disks, *e e'*, the bearing-surfaces of which are preferably made of leather, though other suitable material might be employed. These disks are clearly shown in Fig. 5, and their position longitudinally upon the shaft C is readily determined by securing them upon said shaft and locking them, when located, by lock-nuts o. These disks engage with the metallic disk g, which can be brought in contact with either one or the other of them at will. This disk g is mounted upon a shaft, F, supported in a frame, h. The frame h is pivoted at one end on the fixed fulcrum j, while its other end is held against the slide-rest by the nuts i, the bolts of which pass through slots in the adjustable frame.

It will thus be apparent that by swinging the frame h about the pivot j either one or the other of the disks e e' can be brought in contact with the disks g at will. The position of this frame h is determinable by the eccentric l. This eccentric is connected by link L to the frame h, and by means of it that frame can be swung in either direction. Of course many other devices might be used, but the one here shown is very convenient, for by means of it the disk g can be caused to revolve in either direction, and its motion in either direction can be independently regulated, so that it may move faster when moving in one direction than when it moves in the other, which, under certain circumstances, is desirable in the practical operation of the apparatus. We prefer to support the shaft c at its end by means of the thrust-rings shown in Figs. 7, 8, and 9. The upper half of the bearing n is removable to allow the placing of these rings in position in the well-known manner.

The operation of our apparatus can now be readily understood. Supposing it be desired to separate starch-water containing starch and gluten, so as to deposit the starch in the machine and remove the gluten and water therefrom, the machine may be operated as follows: The basket is put in motion and the eccentric l is so located that neither wheel e nor e' comes in contact with the disk g, which consequently remains stationary. A suitable amount of liquid is then allowed to flow into the bottom of the basket by means of a suitable tube. Thence it goes directly to the periphery of the basket, and there forms a hollow cylinder, the starch particles going to the outside or against the periphery of the basket and the liquid and gluten standing on the inside thereof. The cutter should then be moved by its feed-screw as close as possible to the periphery of the basket, and the starch-water should be allowed to flow freely into the basket, care being taken to regulate the feed according to the capacity of the machine. The eccentric is then so operated as to cause the screw s to be turned in the direction which will cause the gradual withdrawal of the cutter from the periphery of the basket. The proper velocity of this movement can be readily determined by experiment by means of adjusting the friction-disk e' to the proper position. The liquid deposited upon the bottom of the basket will flow rapidly to the edge, and then upward upon the side until it meets the cutter, which is located as close as possible to the upper corner of the basket. During the upward flow of the liquid the larger part of the starch is deposited partly by centrifugal force direct and partly by a peculiar property of the starch-globules to be retained by formerly-deposited starch-surfaces, while the gluten, which is more slippery, is carried along by the current and removed from the machine by the scraper, together with the superfluous liquor which stands within the starch-ring. It will therefore easily be seen that the speed of the scraper should depend upon the amount of deposit in the machine. As soon as the basket is filled with pure starch the feed-motion of the scraper is stopped and the cock closed, so as not to admit any more liquor. The scraper is now turned back, so as just to enter the surface of the starch-ring, and a small amount of water admitted into the machine. This washes off any gluten or impurities that may have adhered to the surface of the starch, and the impurities and the water escape through the scraper, leaving the starch dry and clean. If it is desired to remove the starch in a liquid form from the machine, the scraper is now made to move toward the rim of the basket from the axis by throwing the other friction-disk, e, in contact with the disk g, and the starch is washed up by means of a jet of water issuing from a hose-nozzle or other suitable contrivance. In this operation care must be taken not to admit more water than can be constantly removed from the basket by the scraper, as any superfluous liquid in the basket would be the cause of undue oscillations in the apparatus. For purposes where the starch is to be used dry, it may be removed from the basket by the same means as are used for removing sugar from similar machines, and the machine should then be made with openings in the bottom in the well-known way. The gluten and water which are removed from the basket in the practical operation of this machine can be preserved when it is desired to employ the gluten for other purposes, or to dry the same.

We do not in this application claim the apparatus described, having made a separate application therefor.

What we claim as our invention, and desire to secure by Letters Patent, is—

1. The process of producing pure starch, which consists in causing the liquid containing said starch to flow into a centrifugal machine and to be separated by said machine into starch and gluten, and of then removing said gluten during the deposit of the starch, substantially as described.

2. The process herein described of producing pure starch and removing it, which consists in causing a suitable amount of starch-water to flow into a centrifugal machine, and to be separated thereby into starch and gluten, in continously removing the gluten as it is deposited, and in removing the starch by the addition to it of a suitable amount of water in the centrifugal machine, substantially as described.

TEILE HENRY MÜLLER.
J. W. DECASTRO.

Witnesses:
GEO. H. EVANS,
ANTHONY GREF, Jr.